United States Patent

Michell et al.

[11] Patent Number: 5,921,376
[45] Date of Patent: Jul. 13, 1999

[54] HIGH SPEED REVOLVING LUG LOADER WITH RETRACTING HEEL AND HOOK

[75] Inventors: Steven W. Michell; Emeric Johnson, both of Salmon Arm, Canada

[73] Assignee: CAE Newnes Ltd., Salmon Arm, Canada

[21] Appl. No.: 08/710,437

[22] Filed: Sep. 17, 1996

[30] Foreign Application Priority Data

Sep. 16, 1996 [CA] Canada .................................. 2185620

[51] Int. Cl.$^6$ .................................................. B65G 29/00
[52] U.S. Cl. .................................. 198/476.1; 198/463.5; 198/459.5
[58] Field of Search ............................. 198/463.5, 459.5, 198/476.1

[56] References Cited

U.S. PATENT DOCUMENTS

| 4,144,976 | 3/1979 | Rysti ........................................ 414/42 |
| 4,330,055 | 5/1982 | Lunden .................................. 198/474 |
| 4,372,438 | 2/1983 | Hayashi ................................. 198/459 |
| 5,419,425 | 5/1995 | Goater .................................. 198/461.3 |
| 5,662,203 | 9/1997 | St. Pierre et al. ................... 198/463.5 |
| 5,813,512 | 9/1998 | Andersson et al. .................. 198/463.5 |

FOREIGN PATENT DOCUMENTS

| 502863 | 5/1920 | France ........................... B27B 25/04 |
| 274767 | 5/1914 | Germany ........................... B65G 7/12 |
| 2320033 | 10/1974 | Germany ......................... B65G 47/08 |
| 19 40 026 | 7/1978 | Germany ......................... B65G 47/29 |
| 409 839 | 9/1979 | Sweden .......................... B65G 47/08 |

*Primary Examiner*—Joseph E. Valenza
*Assistant Examiner*—Joe Dillon, Jr.
*Attorney, Agent, or Firm*—Antony C. Edwards

[57] ABSTRACT

A lug loader singulates elongate workpieces from a lugged infeed transfer onto a lugged outfeed transfer. A disc is rotatable mounted between the infeed and outfeed transfers. Pivotable heels are mounted around the periphery of the disc. The heels are elongate and mounted so that they may be pivoted to extend outwardly from the periphery of the disc. When so extended the heels lift workpieces waiting on the infeed transfer and carry the workpieces over the disc as the disc rotates so as to release the workpieces onto the outfeed transfer. Each heel has a cam follower which travels along the lower cam surface of a selectively pivotable stop arm. When the stop arm is pivoted inwardly relative to the disc, the lower cam surface forces rotation of the heels into their outwardly extended position. Flow of workpieces is stopped when the stop arm is pivoted outwardly relative to the disc so as to remove the cam surface from the path of the cam followers. The heels are thus not rotated into their outwardly extended position and therefore do not pick up workpieces waiting on the infeed transfer.

14 Claims, 7 Drawing Sheets

HIGH SPEED REVOLVING LUG LOADER WITH RETRACTING HEEL AND HOOK

FIELD OF THE INVENTION

This invention relates to an apparatus for delivering lumber into lug spaces on a lugged transfer, and in particular relates to an apparatus capable of collecting, singulating and consistently delivering, rough sawn lumber or planed finished lumber of varying widths, thickness and lengths into consecutive lugs, (or at random leaving an empty lug for a cut-in-two situation) on a lugged transfer at high speeds, as required by modem sawmills.

BACKGROUND OF THE INVENTION

Conventional lumber lug loaders have been refined over the years so as to operate quite adequately in basic situations, but are found to be inadequate when it comes to higher speeds and are not very versatile in the singulating and feeding of lumber of varying width and height, into lug spaces. There are fewer problems encountered when handling lumber that has been planed, which is uniform in width and height, but when the lumber being handled is of varying widths and varying in thickness, or bowed (as may be more predominant in modem curve sawing mills), cupped or crooked, it becomes increasingly difficult to handle the lumber at acceptable speeds. There have been some attempts at solving these problems in the past, but these devices are usually limited in their success when the lumber being stacked is not uniform in size and shape, and when the stacking speeds are increased.

An example of a lug loader is U.S. Pat. No. 3,923,142 issued to Rysti in 1975, for a Method and Apparatus for Dosage of Sawn Timber. Although this system is somewhat successful at delivering lumber to a lugged transfer, its design is questionable when it comes to handling varying widths and thickness, as well this design was never very successful in the industry.

Applicant is also aware of U.S. Pat. No. 5,518,106 issued to Allard in 1996, for an Apparatus for Separating and Individually Feeding Boards and Cants to a Processing Unit. The Allard device uses a fixed heel on the rotating discs, that have a tendency to mark the underside of the board as it is released. The device also requires a speed up belt to pull the board away from the fixed heel at the top of the disc to prevent deep marking of the board and to prevent the board from being flipped. In some mills the boards have been marked for trimming etc. before the lug loader, and if the board has been flipped (as does happen some times with the Allard device even with a speed up belt) then the board has to be flipped back to read the mark, which can be difficult in a high speed feeding situation.

The speed up belt at the top of the rotating disc causes the out feed to have to change elevation, which can be expensive, and which takes up more floor space which may not be available in a retrofit situation. If a board is planned or is destine for cabinet making etc. then any marks from the heel will reduce the value of the board.

SUMMARY OF THE INVENTION

The lug loader of the present invention is for singulating elongate workpieces from a longitudinally extending infeed transfer onto a correspondingly longitudinally extending outfeed lugged transfer. The lug loader is disposed between the infeed transfer and the outfeed transfer. The elongate workpieces are transported on the infeed transfer and the outfeed transfer aligned so as to be supported along their length generally laterally across the infeed transfer and the outfeed transfer.

The lug loader a has selectively rotatable heel support means, selectively rotatable about a laterally extending axle generally centrally disposed between, and beneath, the infeed transfer and the outfeed transfer. The heel support has a generally circular workpiece supporting surface in a first generally vertical longitudinally oriented plane. The workpiece supporting surface is rotatable between a workpiece pickup position, adjacently positioned to a waiting workpiece on the infeed transfer, and a workpiece deposit position, adjacently positioned to the outfeed transfer.

A selectively actuable heel is rotatably mounted, in a second plane parallel to the first plane, to the heel support for selective actuation from a closed pincer orientation disposed outwardly of the workpiece supporting surface at the workpiece pickup position to a retracted orientation at a workpiece release position. The workpiece release position is between the workpiece pickup position and the workpiece deposit position.

A cam is pivotally mounted to a support. The can member is pivotable so as to selectively project the cam member. a path of a cam follower on the pincer heel as the heel is rotated on the support, whereby the cam member is selectively engagable with the cam follower at the workpiece pickup position. The cam member has a cam surface engagable with the cam follower. The cam surface defines an arcuate path to thereby cause rotation of the heel, relative to the heel support, into the orientation disposed outwardly of the workpiece supporting surface at the workpiece pickup position. A heel retractor is mounted to the heel support and cooperates with the heel to thereby cause rotation of the heel into the retracted orientation at the workpiece release position.

The heel when in the orientation disposed outwardly of the workpiece supporting surface at the workpiece pickup position is oriented to capture the waiting workpiece at the workpiece pickup position so as to translate the workpiece to the workpiece release position whereat the workpiece rotates down onto the workpiece supporting surface for rotation thereon to the workpiece deposit position.

The lug loader obtains its desired result by first delivering boards on a transfer to a plurality of stops, whereby the boards collect at the hook stops momentarily at start up where the boards are then released to be picked by a heel and hook assembly. The boards are oriented generally perpendicular to a direction of flow along the longitudinally extending transfer so as to orient their length generally laterally across the transfer. There are a plurality of such heel and hook assemblies, rotatably connected to, and radially spaced apart on, each disc of a plurality of rotating discs for engaging the boards along their length and delivering them individually and sequentially to a longitudinally extending lugged transfer for the purpose of grading and sorting downstream in the direction of flow. The number of laterally spaced apart discs depends on the length of boards being separated.

A track controls the movement of the hook and heel. The track also acts as a board stop. When the track is disengaged and rotated from the track roller mounted on the heel. The track is rotated back by a cylinder, lifting it out of the path of the track roller mounted on each heel, and then into the path of the boards, thus stopping the flow of boards for either shutting down the flow (for maintenance etc.) or just to stop the flow momentarily to leave an empty lug space where a long board may be "cut in two" as may be required for mill processing. The board that is cut in two will then be directed into the empty lug space provided behind, after being trimmed at a point down stream.

There is an alternate means for holding the boards in place on the heel, which includes an overhead belt, whereby the boards are pinched between the heel and the belt for translation to top dead center where the board is released onto the disc surface for rotational advancement of the boards on to the lugs of a lugged transfer, timed to coincide with the lug spacing on the lugged transfer.

It is therefore an object of the present invention to produce an apparatus wherein the delivery of boards is faster than previous devices and with the movable heel as opposed to a fixed heel, the boards have not the tendency to be flipped or to roll over as they leave the device as is the case with present known devices, thus delivering the boards faster and more precisely than that of most common lug loaders of the general type.

It is another object of the invention to produce an apparatus that can be retrofitted in the same spacing as any existing lug loader of the general type, and without needing a speed up belt or an elevation change.

It is yet another object of the invention to produce a lug loader that does not leave marks in the board by the heel (by rotating the heel back away from the board before the disc deposits the board directly into the advancing lug spacing) as is the case with present known devices which utilize a fixed heel on the rotating discs.

The invention provides other advantages which will be made clear in the description of the preferred embodiments.

BRIEF DESCRIPTION OF THE DRAWINGS

The invention will be better understood by reference to the accompanying drawings, wherein.

DETAILED DESCRIPTION OF THE PREFERRED EMBODIMENT

Referring to the drawing figures wherein similar characters of reference represent corresponding parts in each of several views, the lug loader apparatus is generally indicated by the reference numeral 10.

Lug loader 10 is supported by structural supports 12. Infeed transfer 14 translates boards 16 in a longitudinal flow direction along infeed transfer 14, over lug loader 10 and along outfeed lug transfer 28a. Boards 16 are generally aligned perpendicular to the flow direction, that is, board 16 extend along their length laterally across the flow direction A.

Figure 1:
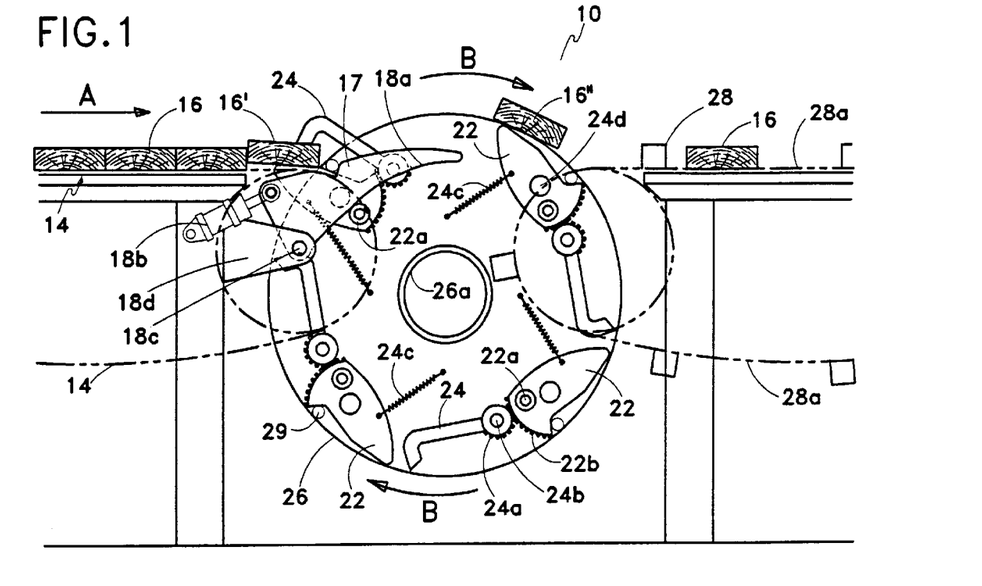
FIGS. 1, 2, 3, and 4, are side elevation views according to the preferred embodiment of the invention showing boards being lifted and placed into a lugged transfer in a progressive sequence.
Figure 1A:
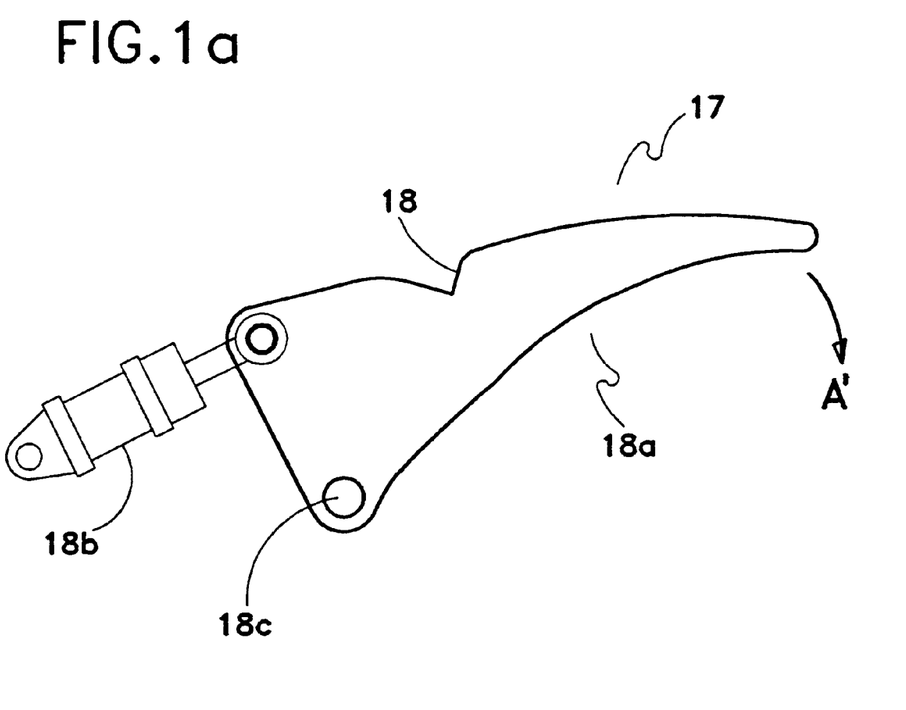
FIG. 1a is a side elevation view of the stop arm of the lug loader of the present invention.
Figure 1B:
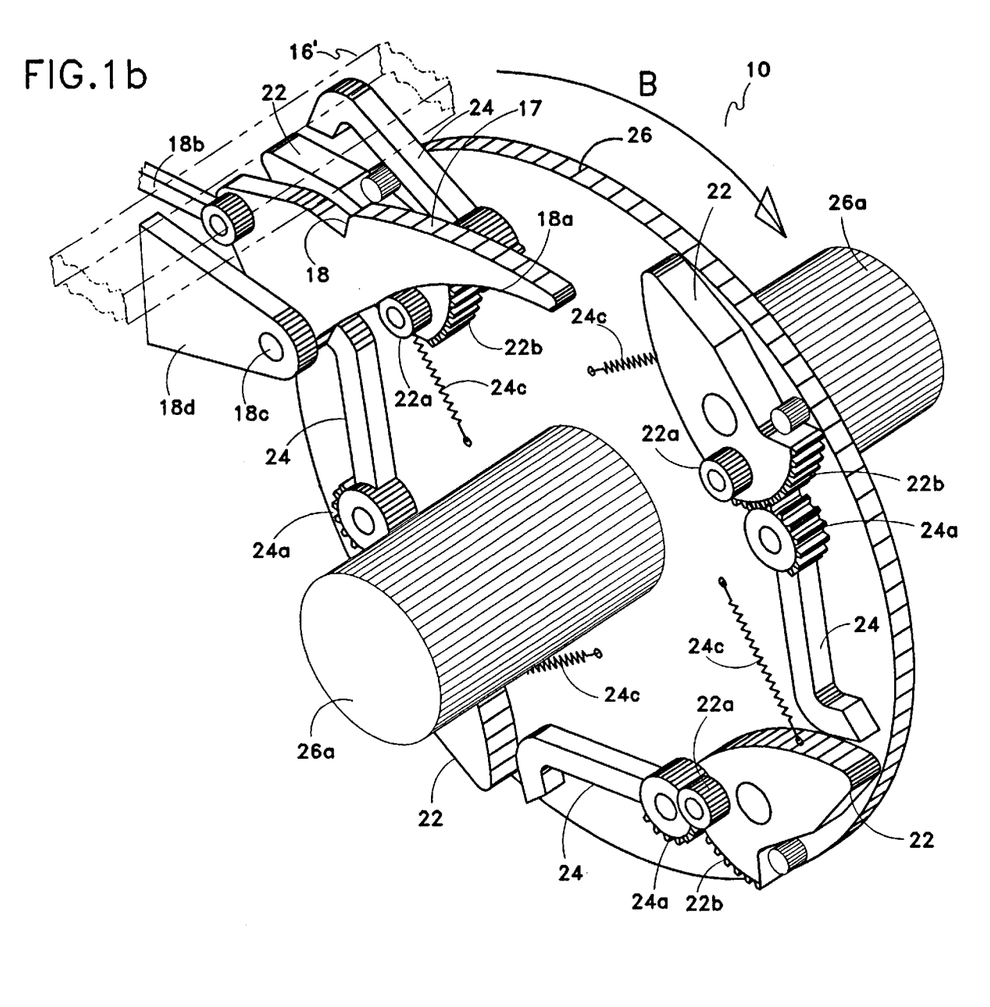
FIG. 1b is a perspective view of the lug loader embodiment of FIG. 1.
Figure 2:
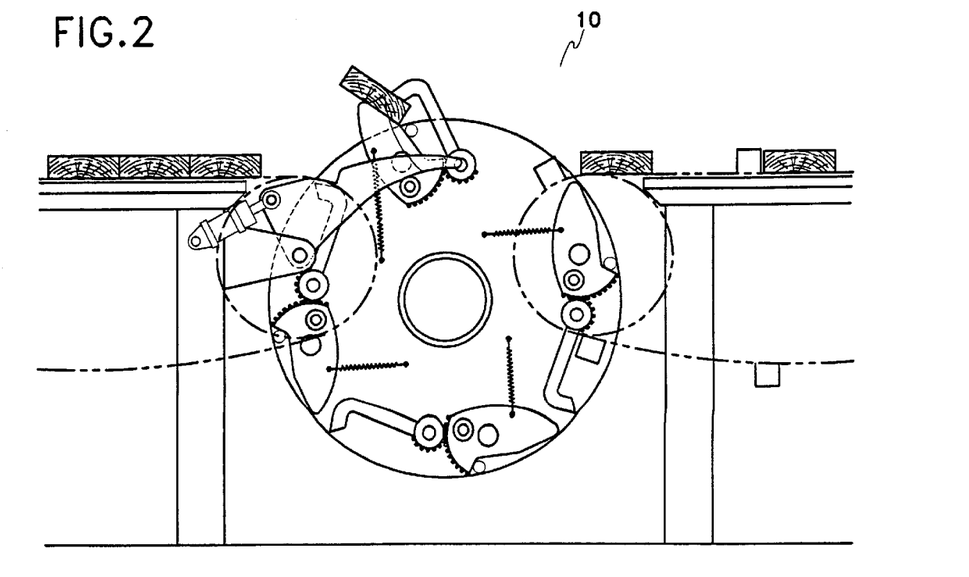
Figure 3:
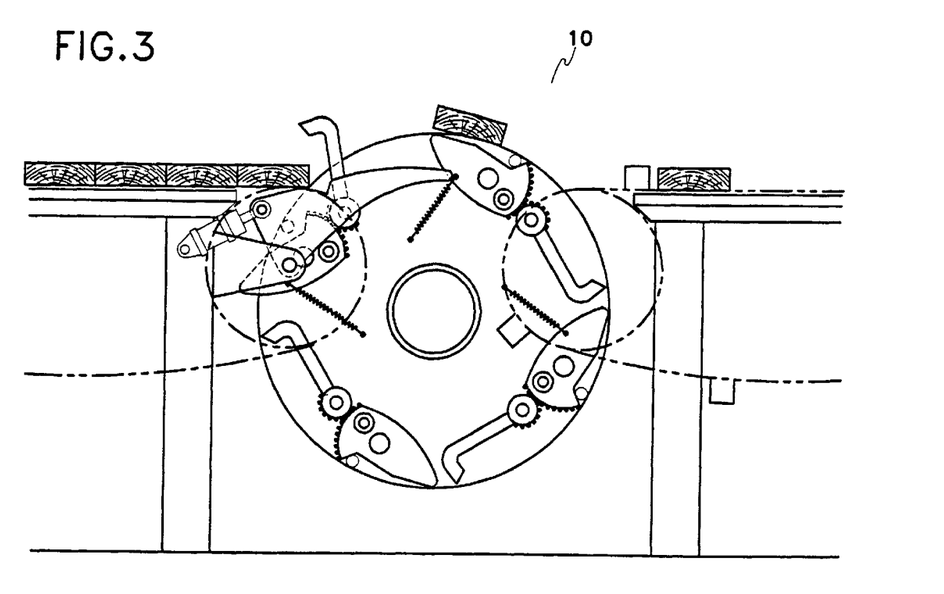
Figure 4:
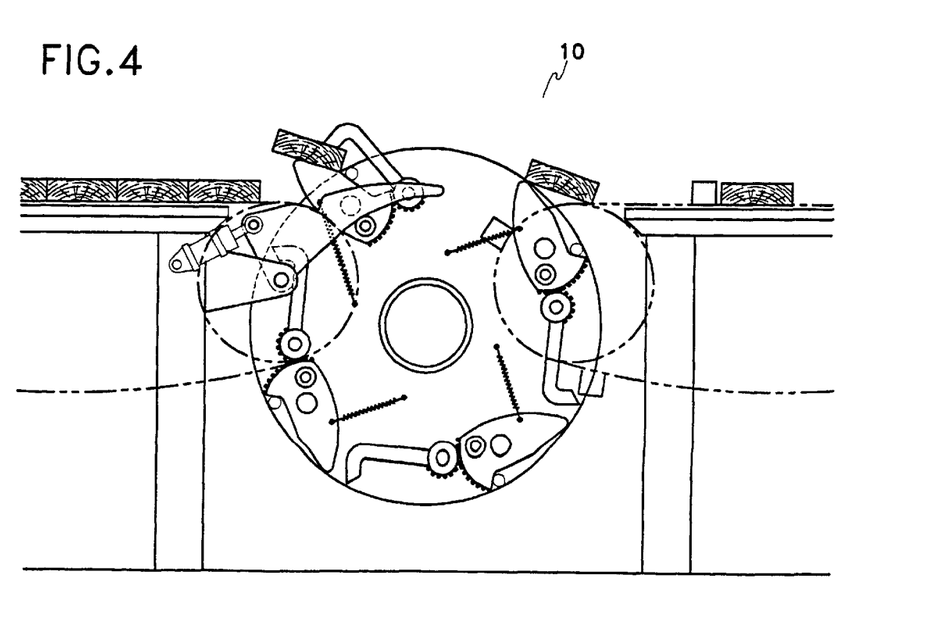
Figure 5:
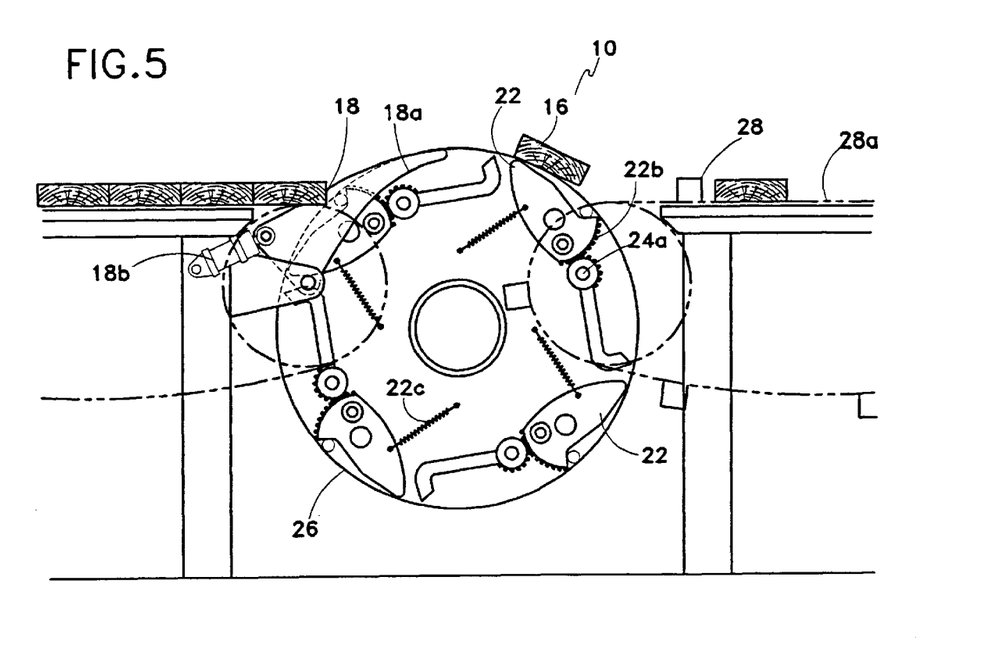
FIG. 5 is a side elevation view according to the preferred embodiment of the invention showing the track disengaged and stopping the flow boards.

As better seen in FIGS. 1a and 1b, stop arm 17 has stops 18 which, when stop arm 17 is rotated into the direction of board flow A, acts to catch boards 16 in the notch forming stop 18. In preferred embodiments of the present invention, two or more laterally spaced apart stop arms 17 may be required depending on the length of boards 16 as will be well appreciated by those skilled in the art. A lower concave curved surface of stop arm 17 provide tracks 18a to engage track followers 22a on heels 22 when stop arm 17 is rotated by actuators 18b about pivot 18c on pivot supports 18d downwardly in direction A'.

Heels 22 are rotatably mounted on disc 26. It is understood that although reference is made to disc 26 in the singular, that, as will be apparent to those skilled in the art, a plurality of discs 26 in laterally spaced array across the flow of boards 16 may be required depending on the length of the boards. Disc 26 is selectively rotatable in direction B. As disc 26 rotates in direction B, heels 22 and corresponding hooks 24, rotatably mounted on disc 26, are also rotated in direction B. Track follower 22a is mounted to heel 22 and extends laterally thereof so as to engage track 18a as disc 26 is rotated in direction B. As track follower 22a slides along track 18a when stop arm 17 is in the lowered position, track follower 22a follows the concave curved path defined by track 18a moving radially inward relative to disc 26 thereby activating a pincer movement between heel 22 and its corresponding hook 24.

Toothed gears 22b on heels 22 engage, as by meshing, rotatable gears 24a on hooks 24. Corresponding heels 22 and hooks 24 are adjacently mounted, radially spaced around disc 26 so as to mesh gears 22b with gears 24a. Gears 24a and hooks 24 are rotatably mounted on shafts 24b. Shafts 24b extend laterally through disc 26, where it is understood that disc 26 lies generally in a vertical longitudinally oriented plane. Resilient biasing tensioning means 24c which may be a helical spring, is connected at one end of tensioning means 24c to hook 24 and at the opposed end of tensioning means 24c to disc 26, spaced radially inward of the end connected to hook 24 so as to bias hook 24 and heel 22 into an open pincer orientation such as shown at top dead center on disc 26 in FIG. 1.

When rotation of gear 24a about shaft 24b is activated by sliding track follower 22a along track 18a on stop arm 17, gear 24a rotates gear 22b so as to cause corresponding rotation of heel 22 about pivot 24d, whereby hook 24 and heel 22 rotate to a closed pincer orientation so as to clamp a waiting board 16' between the distal clamping ends of hook 24 and heel 22. Once clamped between hook 24 and heel 22, waiting board 16' is rotated along with the rotation of disc 26 in direction B in an upwardly curved arc generally in board flow direction A, the object being to deposit the board onto lugged transfer 28a in the lug spacing between correspondingly timed lugs 28.

At top dead center on disc 26, hooks 24 and corresponding heels 22 retract, that is, rotate from the closed pincer orientation to the open pincer orientation away from the carried board 16" thus allowing the carried board 16" to rotate down onto the upper surface of disc 26. As disc 26 continues to rotate in direction B, carried board 16" is advanced into a corresponding lug space on the lug transfer 28a.

The rotation of hook 24 and heel 22 into the open pincer orientation under the biasing force of tensioning means 24c, rotates heel 22 against stops 29.

Figure 6:
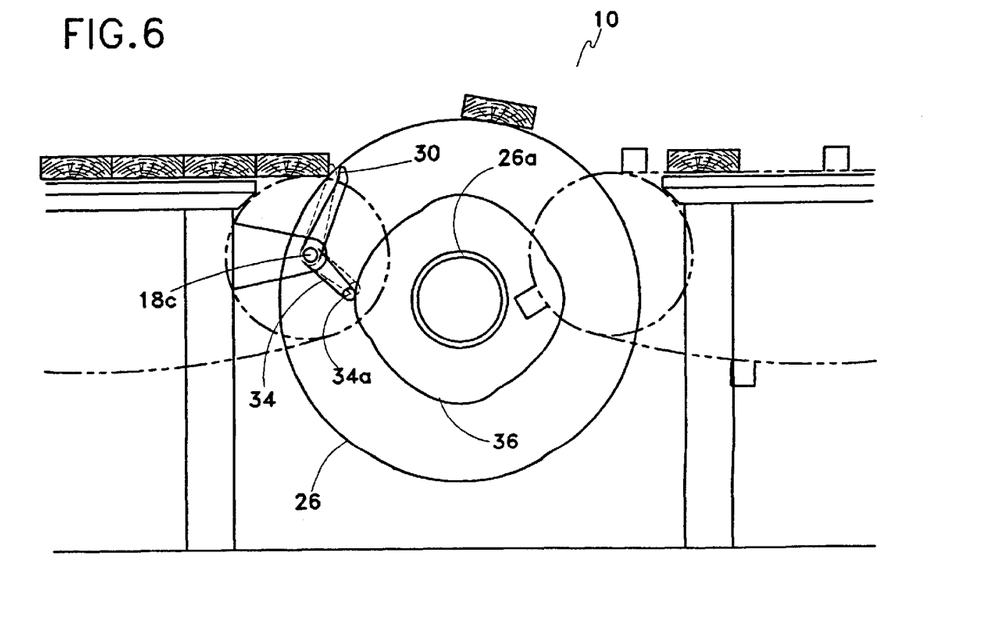
FIG. 6 is a side elevation view according to the preferred embodiment of the invention showing an optional timing hook stop.
Figure 9:
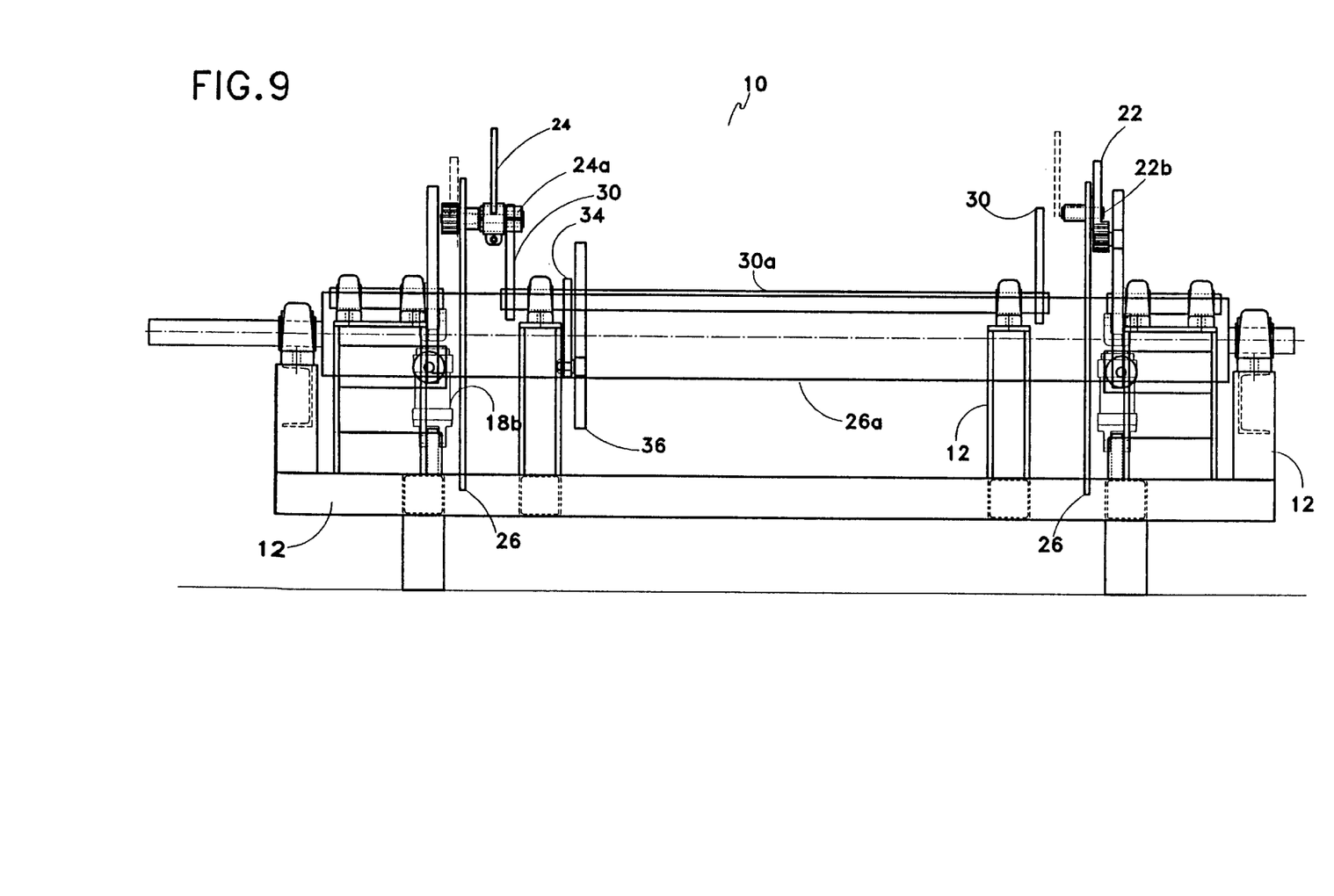
FIG. 9 is an end elevation view according to the preferred embodiment of the invention.

Acting in conjunction with lug loader 10, and also amounted on disc axle 26a, may be at least one cam disc 36 as seen in FIGS. 6 and 9. Cam disc 36 provides a camming surface for cam follower 34a on L-shaped arm 34. L-shaped arm 34 may be rotatably mounted also on pivot 18c which may be a shaft extending between pivot supports 18d. The uppermost end of L-shaped arm 34 form hook stops 30. Rotation of cam disc 36 on disc axle 26a drives the rotation of L-shaped arm 34 so as to raise and lower hook stops 30 thereby allowing timed positioning of waiting board 16' prior to clamping of waiting board 16' between heel 22 and hook 24. Preferably hook stops 30 are lowered as a heel 22 comes into contact with waiting board 16'.

Figure 7:
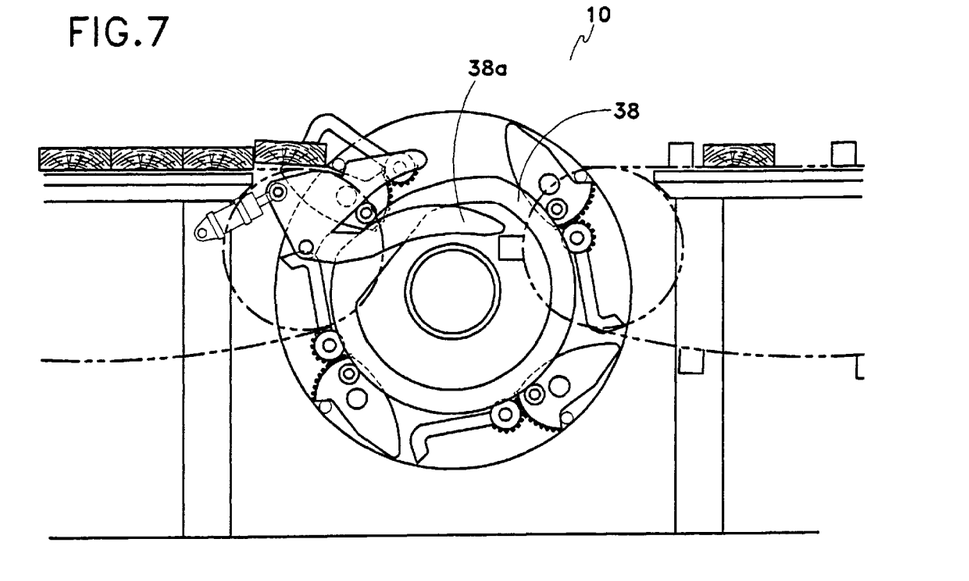
FIG. 7 is a side elevation view according to an alternative embodiment of the invention showing the boards being lifted and being placed into the lugged transfer, where a heel return spring is replaced by a track.

In an alternative embodiment illustrated in FIG. 7, a second track 38 returns heel 22 to its retracted position in substitution for tensioning means 24c. Track 38 is positioned around the full revolution of the disc 26 and has a movable track 38a that comes up with the track 18a when the track 18a is disengaged. This movable track 38a just ensures retraction of the heel, eliminating the use of springs to return heels 22.

Figure 8:
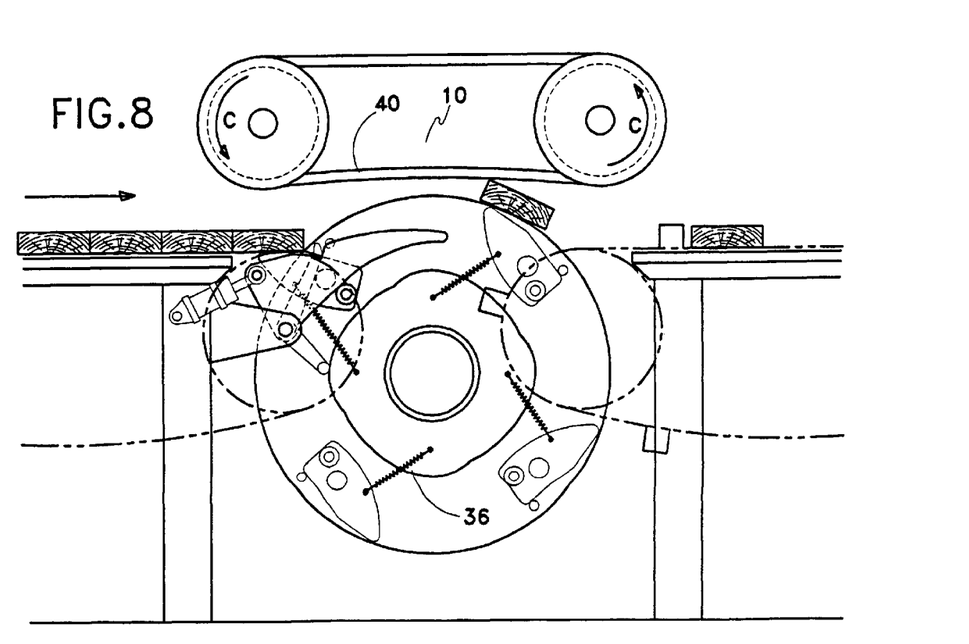
FIG. 8 is a side elevation view of a second alternate embodiment showing a overhead belt arrangement that replaces the need for an a pinching hook.

In a second alternative embodiment as seen in FIG. 8, an overhead belt 40 selectively rotatable in direction C replaces hooks 24.

It is apparent that variations, combinations, and modifications of the invention can be made without departing from the spirit or scope thereof. Such variations, combinations, and modifications are meant to be comprehended within the scope of the invention.

What is claimed is:

1. A lug loader for singulating elongate workpieces from a longitudinally extending infeed transfer onto a correspondingly longitudinally extending outfeed lugged transfer, said lug loader disposed between said infeed transfer and said outfeed transfer, said elongate workpieces transportable on said infeed transfer and said outfeed transfer aligned so as to be supported along their length generally laterally across said infeed transfer and said outfeed transfer, said lug loader comprising:

a selectively rotatable heel support, selectively rotatable about a laterally extending axle generally centrally disposed between, and beneath, said infeed transfer and said outfeed transfer, said heel support comprising a generally circular workpiece supporting surface in a first generally vertical longitudinally oriented plane, said workpiece supporting surface rotatable between a workpiece pickup position, adjacently positionable to a waiting workpiece on said infeed transfer, and a workpiece deposit position, adjacently positionable to said outfeed transfer, a selectively actuable heel rotatable mounted, in a second plane parallel to said first plane, to said heel support for selective actuation from an orientation disposed outwardly of said workpiece supporting surface at said workpiece pickup position to a retracted orientation at a workpiece release position between said workpiece pickup position and said workpiece deposit position, a cam member pivotally mounted to a support, pivotable so as to selectively project said cam member into a path of a cam follower on said heel as said heel is rotated on said support, whereby said cam member is selectively engagable with said cam follower at said workpiece pickup position, said cam member having a cam surface engagable with said cam follower, said cam surface defining an arcuate path to thereby cause rotation of said heel, relative to said heel support, into said orientation disposed outwardly of said workpiece supporting surface at said workpiece pickup position, a heel retractor mounted to said heel support and cooperating with said heel to thereby cause rotation of said heel into said retracted orientation at said workpiece release position, said heel, when in said orientation disposed outwardly of said workpiece supporting surface at said workpiece pickup position, oriented to capture said waiting workpiece at said workpiece pickup position, so as to translate said waiting workpiece to said workpiece release position whereat said waiting workpiece is deposited from said heel onto said workpiece supporting surface for rotation thereon to said workpiece deposit position.

2. The lug loader of claim 1 further comprising a resilient belt, rotatably mounted on a belt support so as to rotate, in a longitudinal path generally parallel to said first plane, over said heel support in pincing cooperation with said heel as said heel support is rotated between said workpiece pickup position and said workpiece release position.

3. The lug loader of claim 1 wherein said heel support is a disc.

4. The loader of claim 1 wherein said heel retractor is a resilient spring mounted at one end thereof to said heel and at an opposite end thereof to said heel support.

5. The lug loader of claim 1 wherein said heel retractor is a second cam for urging said heel into said retracted orientation, said cam follower engaging and following a second cam surface on said second cam.

6. The lug loader of claim 1 wherein said rotation of said heel into said retracted orientation at said workpiece release position is also controlled by said cam surface defining said arcuate path such that said heel and said waiting workpiece on said heel are rotated into said retracted orientation.

7. The lug loader of claim 1 wherein said cam member is a stop arm elongate in a third plane parallel and adjacent to said second plane and wherein said stop arm has a stop formed on a top surface of said stop arm and said cam surface is a concave lower surface of said stop arm.

8. The lug loader of claim 7 wherein said stop arm is selectively pivotable relative to said heel support by actuation of an actuator mounted to said stop arm.

9. The lug loader of claim 8 wherein said heel is elongate in said second plane and is pivotably mounted to said heel support between first and second ends of said heel, and wherein said cam follower is mounted to said heel so as to extend laterally outwardly therefrom across said third plane, and wherein of said heel is formed to support a workpiece on an upper surface thereof, and wherein said concave lower surface on said stop arm extends between said first and second ends.

10. The lug loader of claim 9 wherein said stop arm and said heel are in side-by-side adjacent relation when said heel is in said workpiece pickup position and when said heel is in said workpiece release position and said stop arm is pivoted so that said concave lower surface is curved radially inwardly, relative to said disc, with said concave lower surface in engagement with said cam follower on said heel, said heel is actuated into said orientation disposed outwardly of said workpiece supporting surface as said heel support rotates in a first direction so as to translate said cam follower along said concave lower surface in a direction towards said second end of said stop arm.

11. The lug loader of claim 10 wherein, as said cam follower on said heel is rotated in said first direction past said second end of said stop arm so that said cam follower is disengaged from said concave lower surface of said stop arm, said heel retractor pivots said heel so as to rotate said first end of said heel radially inwardly relative to said heel support so as to retract said upper surface of said heel radially inwardly of said workpiece supporting surface of said heel support.

12. The lug loader of claim 11 wherein said heel retractor is a resilient spring mounted at one end thereof to said heel and at an opposite end thereof to said heel support.

13. The lug loader of claim 11 wherein said heel retractor is a second cam for urging said heel into said retracted orientation, said cam follower engaging and following a second cam surface on said second cam.

14. The lug loader of claim 11 wherein said heel support is a disc.

* * * * *